US009641500B2

(12) United States Patent
Rahja et al.

(10) Patent No.: US 9,641,500 B2
(45) Date of Patent: May 2, 2017

(54) METHOD AND APPARATUS FOR DETERMINING MULTIMEDIA DATA AUTHENTICITY LEVEL

(71) Applicant: P2S Media Group Oy, Helsinki (FI)

(72) Inventors: Petri Rahja, Espoo (FI); Mark Halmagiu, Helsinki (FI); Jussi Pekka Markula, Lahti (FI)

(73) Assignee: P2S Media Group Oy, Helsinki (FI)

( * ) Notice: Subject to any disclaimer, the term of this patent is extended or adjusted under 35 U.S.C. 154(b) by 417 days.

(21) Appl. No.: 14/253,686

(22) Filed: Apr. 15, 2014

(65) Prior Publication Data

US 2014/0325630 A1  Oct. 30, 2014

(30) Foreign Application Priority Data

Apr. 17, 2013  (FI) ..................................... 20135377

(51) Int. Cl.
*H04N 7/16* (2011.01)
*H04L 29/06* (2006.01)
(Continued)

(52) U.S. Cl.
CPC .............. *H04L 63/08* (2013.01); *G06F 21/31* (2013.01); *G06F 21/64* (2013.01); *H04L 63/12* (2013.01); *H04L 63/123* (2013.01); *H04W 12/10* (2013.01); *H04N 2201/3253* (2013.01); *H04W 4/185* (2013.01)

(58) Field of Classification Search
USPC ....................................................... 725/5, 7
See application file for complete search history.

(56) References Cited

U.S. PATENT DOCUMENTS

2006/0114338 A1   6/2006  Rothschild
2007/0049250 A1*  3/2007  Chambers ............... G06F 21/64
                                                                     455/411
2010/0245042 A1   9/2010  Tsubaki

FOREIGN PATENT DOCUMENTS

EP   1835431 A1   9/2007
WO   2012170111 A1   12/2012

OTHER PUBLICATIONS

Paul Blythe and Jessica Fridrich: "Secure Digital Camera", Internet Citation, Aug. 11, 2004 (Aug. 11, 2004), XP002413047, Retrieved from the Internet: URL:http://www.ws.binghamton.deu/fridrich/Research/DFRWfinal.pdf [retrieved on Jan. 3, 2007] abstract 3. Secure Digital Camera Solution.
(Continued)

*Primary Examiner* — Michael Lee
*Assistant Examiner* — Omer Khalid
(74) *Attorney, Agent, or Firm* — Ziegler IP Law Group, LLC

(57) ABSTRACT

A method for providing multimedia data including receiving multimedia data, from a second user; determining user information relating to the second user; defining a first authenticity value based on the user information; determining multimedia data characteristics relating to the multimedia data; defining a second authenticity value based on the multimedia data characteristics; defining a multimedia data authenticity value using the first and the second authenticity value; and maintaining, by the operator, the received multimedia data associated with the multimedia data authenticity value, wherein the multimedia being available for a third user.

15 Claims, 4 Drawing Sheets

(51) Int. Cl.
G06F 21/31 (2013.01)
G06F 21/64 (2013.01)
H04W 12/10 (2009.01)
H04W 4/18 (2009.01)

(56) References Cited

OTHER PUBLICATIONS

International Search Report and Written Opinion of the International Searching Authority for PCT/FI2014/050270, mailed Aug. 14, 2014, 11 pages.
Finnish Office Action, Finnish Patent and Registration Office, Patent Application No. 20135377, dated Feb. 28, 2014.

\* cited by examiner

METHOD AND APPARATUS FOR DETERMINING MULTIMEDIA DATA AUTHENTICITY LEVEL

TECHNICAL FIELD

The present application generally relates to a method, a system and an apparatus for providing multimedia data. The present application further relates to a method, a system and an apparatus for providing multimedia data associated with multimedia data authenticity value.

BACKGROUND ART

A mobile apparatus may create multimedia data using, for example, camera and voice recording means for producing still images and/or streaming voice or video data.

The mobile apparatus may also have some connectivity means for connecting the device to a network or to another device for uploading the captured images from the storage media of the camera to another storage media.

Services exist in networks, e.g. in the internet, for managing data, e.g. multimedia data, received from mobile apparatuses. The services are typically accessed via a web browser or using a client application made specifically for the purpose of accessing the service. The services may provide multimedia data for users based on certain criteria for the multimedia data.

Mobile apparatuses are also connectable to devices such as cameras using a wired or wireless data communication means. The wired data communication means may be e.g. a USB (Universal Serial Bus) connection. The wireless data communication means may utilize e.g. a Bluetooth™ or a wireless LAN connection between the apparatus and the camera.

Because the service system provides different kinds of multimedia data for users from users, the users need to be provided an authenticity level of multimedia data. Such authenticity level would provide enhanced security and reliability for the multimedia data provided by the system. A solution for defining an authenticity level for the captured multimedia data is needed. Such authenticity level should improve the accuracy and reliability of the multimedia captured by a certain multimedia device for a certain task and should enhance the availability and options of the captured multimedia for potential buyers.

SUMMARY

According to a first example aspect of the present disclosure there is provided a method for providing multimedia data, the method comprising:
 receiving multimedia data, from a second user;
 determining user information relating to the second user;
 defining a first authenticity value based on the user information;
 determining multimedia data characteristics relating to the multimedia data;
 defining a second authenticity value based on the multimedia data characteristics;
 defining a multimedia data authenticity value using the first and the second authenticity value; and
 maintaining, by the operator, the received multimedia data associated with the multimedia data authenticity value, wherein the multimedia being available for a third user.
 In an embodiment, the method further comprises:

defining, by a first user, a task for requesting multimedia data, wherein the task comprising criteria for the requested multimedia data;
 maintaining, by an operator, the defined task based on the criteria, wherein the task being available for a second user; and
 receiving multimedia data, from the second user, in response to the defined task based on the criteria.
 In an embodiment, the multimedia data characteristics comprise at least one of the following:
 an application identifier for indicating an application capturing the multimedia data;
 path information for indicating receiving path of the multimedia data from the second user;
 location information associated with the multimedia data;
 metadata of the multimedia data; and
 resolution information of the multimedia data.
 In an embodiment, the method further comprises:
 defining the second authenticity value using the multimedia data characteristics with different weighting factors.
 In an embodiment, the user information comprises at least one of the following:
 an e-mail address;
 a phone number;
 an external verification; and
 a history value.
 In an embodiment, the external verification comprises at least one of bank verification or credit card information.
 In an embodiment, the method further comprises:
 defining the first authenticity value using the user information with different weighting factors.
 In an embodiment, the criteria comprise the multimedia data authenticity value.
 In an embodiment, the method further comprises:
 defining the multimedia data authenticity value using the first and the second authenticity value with different weighting factors.
 In an embodiment, the method further comprises:
 determining a first weighting factor for the first authenticity value and a second weighting factor for the second authenticity value; and
 defining the multimedia data authenticity value using the first and the second weighting factors.
 In an embodiment, the method further comprises:
 receiving a request for the multimedia data from the third user; and
 transmitting the multimedia data for the third user.
 In an embodiment, the request is associated with criteria comprising the multimedia data authenticity value.
 In an embodiment, the method further comprises:
 providing the multimedia data authenticity value for the third user using at least one of the following:
 a color code;
 a percentage;
 a bar; and
 a meter.
 In an embodiment, the criteria may comprise at least one of the following:
 subject for the multimedia data;
 location for the multimedia data;
 identified second users;
 submission time for the multimedia data;
 capturing time for the multimedia data;
 availability time for the multimedia data to third users;
 ownership for the multimedia data;
 submission price information for the received multimedia data; and service price information for the transmitted multimedia data.

In an embodiment, the method further comprises:

receiving payment from the third user based on the service price information; and providing payment for the first user, the second user and the operator based on the submission price information and the service price information.

In an embodiment, the method further comprises:

checking location information from metadata of the received multimedia data;

comparing the location information to the location comprised by the criteria; and maintaining the multimedia data in response to a successful comparison step.

According to a second example aspect of the present disclosure there is provided an apparatus comprising:

a communication interface for transceiving multimedia data;

at least one processor; and at least one memory including computer program code;

the at least one memory and the computer program code configured to, with the at least one processor, cause the apparatus to:

receive multimedia data, from a second user;

determine user information relating to the second user;

define a first authenticity value based on the user information;

determine multimedia data characteristics relating to the multimedia data;

define a second authenticity value based on the multimedia data characteristics;

define a multimedia data authenticity value using the first and the second authenticity value; and maintain the received multimedia data associated with the multimedia data authenticity value, wherein the multimedia being available for a third user.

In an embodiment, the apparatus may comprise a server apparatus or a user apparatus.

According to a third example aspect of the present disclosure there is provided a computer program embodied on a non-transitory computer readable medium comprising computer executable program code which, when executed by at least one processor of an apparatus, causes the apparatus to:

receive multimedia data, from a second user;

determine user information relating to the second user;

define a first authenticity value based on the user information;

determine multimedia data characteristics relating to the multimedia data;

define a second authenticity value based on the multimedia data characteristics;

define a multimedia data authenticity value using the first and the second authenticity value; and maintain the received multimedia data associated with the multimedia data authenticity value, wherein the multimedia being available for a third user.

Different non-binding example aspects and embodiments of the present disclosure have been illustrated in the foregoing. The above embodiments are used merely to explain selected aspects or steps that may be utilized in implementations of the present disclosure. Some embodiments may be presented only with reference to certain example aspects of the present disclosure. It should be appreciated that corresponding embodiments may apply to other example aspects as well.

BRIEF DESCRIPTION OF THE DRAWINGS

The aspects of the present disclosure will be described, by way of example only, with reference to the accompanying drawings, in which.

DETAILED DESCRIPTION

In the following description, like numbers denote like elements.

Figure 1:
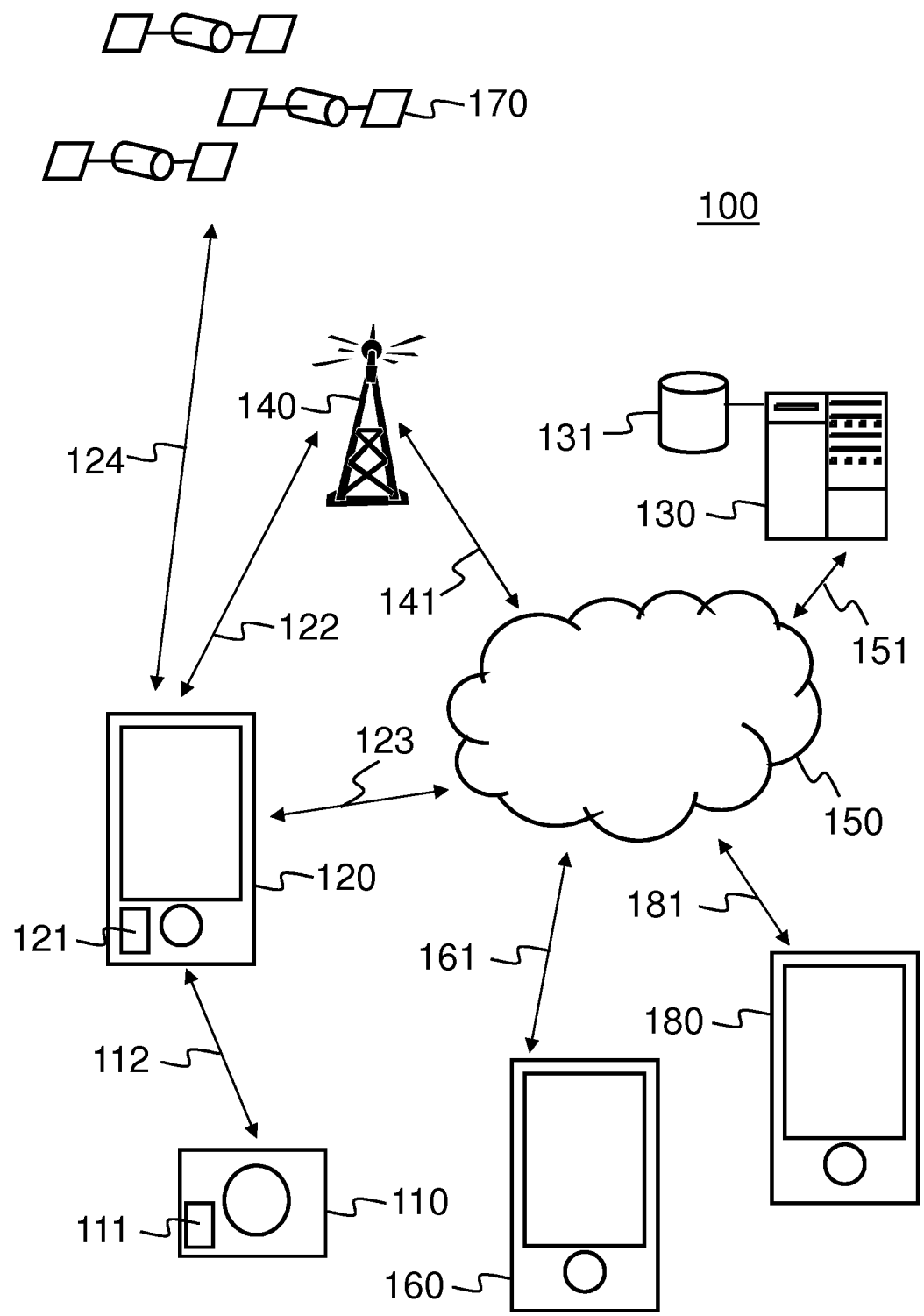
FIG. 1 shows a schematic picture of a system according to an example embodiment of the present disclosure.

FIG. 1 shows a schematic picture of a system 100 according to an example embodiment of the present disclosure. The system 100 comprises a multimedia device 110 configured to be capable of capturing multimedia, such as digital still images and/or video streams. The multimedia device 110 may comprise a storage 111 for multimedia data. The storage 111 may comprise a flash memory card, for example. The multimedia device 110 is configured to be connectable to a user apparatus 120 over a data connection 112. The data connection 112 may be a wired connection or a wireless connection. The wired connection may comprise Universal Serial Bus (USB), High-Definition Multimedia Interface (HDMI) or local area network (LAN), for example. The wireless connection may comprise Bluetooth™, Radio Frequency Identification (RF-ID) or wireless local area network (WLAN), for example.

The multimedia device 110 is configured to send captured multimedia data over the data connection 112 to the user apparatus 120. Such transmittal may be initiated by a user of the multimedia device 110, by a user of the user apparatus 120, or automatically based on settings. Such settings may comprise for example time of the day, amount of newly captured multimedia data or existence of the data connection 112 for the multimedia device 110.

The user apparatus 120 may comprise a multimedia device 110, a mobile phone, an internet tablet or a laptop computer, for example. The user apparatus 120 is capable of downloading and locally executing software program code. The software program code may be a client application of a service whose server application is running on the server apparatus 130 of the system 100. The user apparatus 120 may comprise multimedia capturing element, such as a camera, for capturing multimedia, such as still images or video streams, for example. The user apparatus 120 may also have a metadata element 121 for creating data usable as metadata of the multimedia content captured by the multimedia device 110. The metadata element 121 may comprise at least one of the following: a microphone, a positioning device for determining the current location of the user apparatus 120, and a clock. The user apparatus 120 is configured to be connectable to a wireless communication network 140 over a wireless connection 122. The wireless connection 122 may comprise a mobile cellular network or a wireless local area network (WLAN), for example. The wireless communication network 140 may be connected to a public data communication network 150, for example to the Internet, over a data connection 141.

The system 100 may comprise a plurality of satellites 170 in orbit about the Earth. The orbit of each satellite 170 is not necessarily synchronous with the orbits of other satellites and, in fact, is likely asynchronous. A global positioning system receiver apparatus such as the user apparatus 120 in connection with preferred embodiments of the present disclosure is shown receiving spread spectrum global positioning system (GPS) satellite signals 124 from the various satellites 170.

In an embodiment, the system 100 comprises a server apparatus 130, which comprises a storage device 131 for storing multimedia and/or metadata received over a data connection 151.

In an embodiment, the system 100 may further comprise other user apparatuses 160, 180, wherein tasks for requesting multimedia data based on criteria may be defined. Furthermore, the user apparatuses 160, 180 may be configured to request available multimedia data from the server 130 and receive such data.

In an embodiment, a first user apparatus 160 may be operated by a first user. The first user may define, using the first user apparatus 160, a task for requesting multimedia data, wherein the task comprising criteria for the requested multimedia data. The criteria may comprise authenticity level information associated with the multimedia data. The authenticity level information may be defined using a first authenticity value based on user information, and a second authenticity value based on multimedia data characteristics. The criteria may further comprise, for example, desired subject for the multimedia data, preferred location for the multimedia data, certain identified second users to provide the multimedia data, such as friends or known photographers, desired submission time for the multimedia data or a set capturing time for the multimedia data. Furthermore, the criteria may comprise availability time for the multimedia data to third users; definition of ownership for the multimedia data; submission price information for the received multimedia data; and service price information for the transmitted multimedia data, for example. The defined task with set criteria may be transmitted from the user apparatus 160 over data connections 151, 161 and network 150 to a server apparatus 130.

In an embodiment, a server apparatus 130 is configured to maintain, a first user defined task for requesting multimedia data, the task comprising criteria for the requested multimedia data, wherein the task being available for a second user. Multimedia data may be received, from the second user, in response to the defined task based on the criteria. The second user may utilize, for example, the user apparatus 120 or the multimedia device 110 for capturing requested multimedia data for the task. At the server 130, user information is determined relating to the second user and a first authenticity value based on the user information may be defined. Furthermore, multimedia data characteristics may be determined relating to the multimedia data and a second authenticity value defined based on the multimedia data characteristics. A multimedia data authenticity value may then be defined using the first and the second authenticity value and the received multimedia data associated with the multimedia data authenticity value maintained at the server 130, wherein the multimedia being available for a third user.

In an embodiment, a server apparatus 130 maintains, by an operator, the defined task based on the criteria, wherein the task being available for a second user. The second user may utilize, for example, the user apparatus 120 or the multimedia device 110 for capturing requested multimedia data for the task. The multimedia data may be then transmitted from the apparatus 120 over the network to the server apparatus 130. The server apparatus 130 may receive the multimedia data, from the second user, in response to the defined task based on the criteria. The server apparatus 130 may validate that the received multimedia data matches to the task and its criteria and after the validation may approve the data. Alternatively, the user defining the task is requested to validate the received multimedia data. Eventually, the received multimedia data is maintained, by an operator, at the server 130 comprising storage device 131, wherein the multimedia data being available for a third user. Furthermore, metadata associated with the multimedia data may also be stored in the server 130 or storage device 131, such as location information, time information, a multimedia device identifier, multimedia device model information, software version information of the multimedia device, resolution information of the multimedia device or parameters of a camera of the multimedia device, for example.

In an embodiment, a third user apparatus 180 may be operated by a third user. The third user may have an access to the server apparatus 130 and the multimedia data available there. Furthermore, the third user may use the third user apparatus 180 for requesting the available multimedia data, wherein the multimedia data may comprise criteria for the requested multimedia data described above. The requested multimedia data may be transmitted from the server apparatus 130 over data connections 151, 181 and network 150 to the third user apparatus 180.

Any of the user apparatuses 120, 160, 180 may be operated as the first, second or third user apparatus. Same apparatus may also be used as the first, second and third user apparatus.

In an embodiment, multimedia data captured by a user may travel to a server apparatus 130 over different paths. A first path may comprise sending multimedia data captured by a proprietary application of a user apparatus 120 over a wireless communication network 122, 140, 141 and public data communication network 150, 151 to the server apparatus 130. A second path may comprise sending multimedia data captured by a default application of a user apparatus 120 over a wireless communication network 122, 140, 141 and public data communication network 150, 151 to the server apparatus 130. A third path may comprise sending multimedia data captured by a multimedia device 110 to the user apparatus 120 over connection 112 and therefrom over a wireless communication network 122, 140, 141 and public data communication network 150, 151 to the server apparatus 130. A fourth path may comprise sending multimedia data captured by the multimedia device 110 to a computer apparatus 120 and therefrom over the connection 123 and the public data communication network 150, 151 to the server apparatus 130.

In an embodiment, the proprietary application in the user apparatus 120 may be a client application of a service whose server application is running on the server apparatus 130 of the system 100. The proprietary application may capture the multimedia data for the first path. Also metadata for the captured multimedia may be retrieved by the proprietary application from the metadata elements 121 of the user apparatus 120. The default application may be an imaging application of the user apparatus 120. For the second path, the multimedia data captured by the default application may be imported to the proprietary application before transmitting to the server apparatus 130. The proprietary application may check the multimedia data and extract and apply metadata for the multimedia data. For the third path, the multimedia may be captured by the multimedia device 110 and transmitted to the proprietary application of the user apparatus 120 for sending to the server apparatus 130. The proprietary application may check the multimedia data and extract and apply metadata for the multimedia data. User may provide additional metadata using the user apparatus 120. For the fourth path, the multimedia may be captured by the multimedia device 110 and transmitted to a communication application of a computer apparatus 120. The communication application may check the multimedia data and extract and apply metadata for the multimedia data. User may provide additional metadata using the computer apparatus. In a further embodiment, the user may access the multimedia data on the server apparatus and provide additional metadata.

In an embodiment, a proprietary or client application in the user apparatus 160 defining the task requesting the desired multimedia data may be a client application of a service whose server application is running on the server apparatus 130 of the system 100. The proprietary application may also be utilized for setting the criteria for the task and storing the ready task to the server apparatus 130. Furthermore, the client application may be used to amend the stored task and criteria later on.

In an embodiment, a proprietary or client application in the user apparatus 180 requesting available multimedia data may be a client application of a service whose server application is running on the server apparatus 130 of the system 100. The proprietary application may also be utilized for setting the criteria for the requested multimedia data. The requested multimedia data may be transmitted from the server apparatus 130 over data connections 151, 181 and network 150 to the third user apparatus 180. Furthermore, the client application may be used to amend the request and criteria later on.

In an embodiment, a service user may define a task in the service system 100. Such task may be stored to the server apparatus 130 and comprise a request for certain type of multimedia data with certain criteria. The requested multimedia type may be streaming video or still image, for example. The requested multimedia criteria may comprise, for example, certain location, time, event or object. Other users of the system 100 and registered to the service may capture the requested multimedia data using a user apparatus 120 or a multimedia device 110 and deliver the multimedia data to the server 130 in response to the task.

The requested task may relate to a certain geographical area. For example, the desired multimedia data may relate to an event taking place in certain geographical location.

In an embodiment, the task may be provisioned to a group of users based on certain criteria. For example, the task may be provisioned to certain users that are assumed to be located close to the geographical area of the requested task. In such cases, hotspot information may be used in task provisioning.

First, a new task is received to the system 100 and the task information is stored to the server 130. The task may be created by a user having task creating rights to the system 100 using for example a computer apparatus accessible to the server 130. The task information may comprise a target of the task, a time frame for the task being active, amount of reward money being paid for an approved multimedia data for the task, geographical location coordinates for the task and radius.

Second, the task may be provisioned to a user or users. If the system 100 is able to receive location information for users, such information may be utilized for provisioning. Hotspot information for users may be stored to the system 100 for such purpose. The task may be provisioned to a user if one or two user hotspots with most recent "last seen" timestamp reside in the task's area or if one or two user hotspots of largest "seen count" reside in the task's area, for example.

In an embodiment, user location information gathering apparatus, in which individual location updates and their timestamps are stored, may be implemented in server apparatus 130. The user location update to the server 130 may be utilized by the proprietary application of the user apparatus 120. The update may be done when captured multimedia data is transferred from the user apparatus 120 to the server 130 or in timely basis without need to transfer multimedia data. In the task request information, a hotspot radius may be defined to denote a distance in which the precision of the hotspot may be determined. Such distance may be determined to be short enough for enabling a reliable provisioning but large enough to cover some area of movement for the user. In urban environment, 5 km as hotspot radius may be used, for example.

In an embodiment, a server apparatus 130, 131 operated by an operator may provide an ecosystem or a marketplace for multimedia data. A first user may use a first user apparatus 160 to define a task with set criteria for available multimedia data. The first user may correspond to a seller. A second user may use a second user apparatus 120 or a multimedia device 110 to provide content, such as multimedia data matching to the criteria, for the task. The second user may correspond to content provider for the seller. The operator may correspond to the marketplace owner providing marketplace for the seller to sell content provided by the content provider. A third user may use a third user apparatus 180 to have an access to the marketplace and content sold by the sellers. If the third user decides to buy multimedia data provided, a price for the multimedia may be defined to be paid by the third user. The price paid by the third user may be then divided by the operator, the seller (first user) and the content provider (second user).

In an embodiment, a second user may provide multimedia data to a server apparatus even without any task specified for the multimedia data. Such situation is especially useful in situation when something relevant happens right now. For example any second user may provide multimedia data to the system relating to an acute news topic, sport event, weather disaster or any fresh topic. The provided multimedia data may interest a plurality of third users, such as media houses and newspapers, for example.

In an embodiment, multimedia data characteristics defined at the server 130 for the multimedia data comprise at least one of the following:

an application identifier for indicating an application capturing the multimedia data;

path information for indicating receiving path of the multimedia data from the second user;

location information associated with the multimedia data;

metadata of the multimedia data; and resolution information of the multimedia data.

In an embodiment, the application identifier may comprise a proprietary application identifier.

In an embodiment, the second authenticity value may be defined at the server 130 using the multimedia data characteristics with different weighting factors.

In an embodiment, the user information defined at the server 130 for the user providing the multimedia data comprises at least one of the following: an e-mail address; a phone number; an external verification; and a history value. The external verification may comprise, for example, at least one of bank verification or credit card information. The first authenticity value may be defined using the user information with different weighting factors.

In an embodiment, the multimedia data authenticity value may be defined using the first and the second authenticity value with different weighting factors. A first weighting factor may be determined for the first authenticity value and a second weighting factor for the second authenticity value. The multimedia data authenticity value may then be defined using the first and the second weighting factors.

In an embodiment, the task for requesting multimedia data from a first user for a second user may comprise a multimedia data authenticity value as a parameter for the request. Correspondingly, the request from a third user for multimedia data provided by a second user may be associated with criteria comprising the multimedia data authenticity value.

For any user accessing the server 130 for multimedia data, it is important to provide information on the authenticity of the multimedia data available in the system. The defined authenticity value for the multimedia data may be provided for a user using at least one of the following: a color code; a percentage; a bar; and a meter. The color code may comprise, for example, green/yellow/red color coding to express reliability of the data. The percentage may comprise a numeric value to express the reliability. The bar may comprise visual information for the reliability, where the length of the bar expresses the reliability. The meter may comprise a pointer and a scale, such as a speedometer, to express the reliability.

In an embodiment, the criteria may further comprise at least one of the following:
  subject for the multimedia data;
  location for the multimedia data;
  identified second users;
  submission time for the multimedia data;
  capturing time for the multimedia data;
  availability time for the multimedia data to third users;
  ownership for the multimedia data;
  submission price information for the received multimedia data; and
  service price information for the transmitted multimedia data.

In an embodiment, the method may further comprise receiving payment from the third user based on the service price information; and providing payment for the first user, the second user and the operator based on the submission price information and the service price information.

In an embodiment, the method may further comprise checking location information from metadata of the received multimedia data; comparing the location information to the location comprised by the criteria; and maintaining the multimedia data in response to a successful comparison step.

Figure 2:
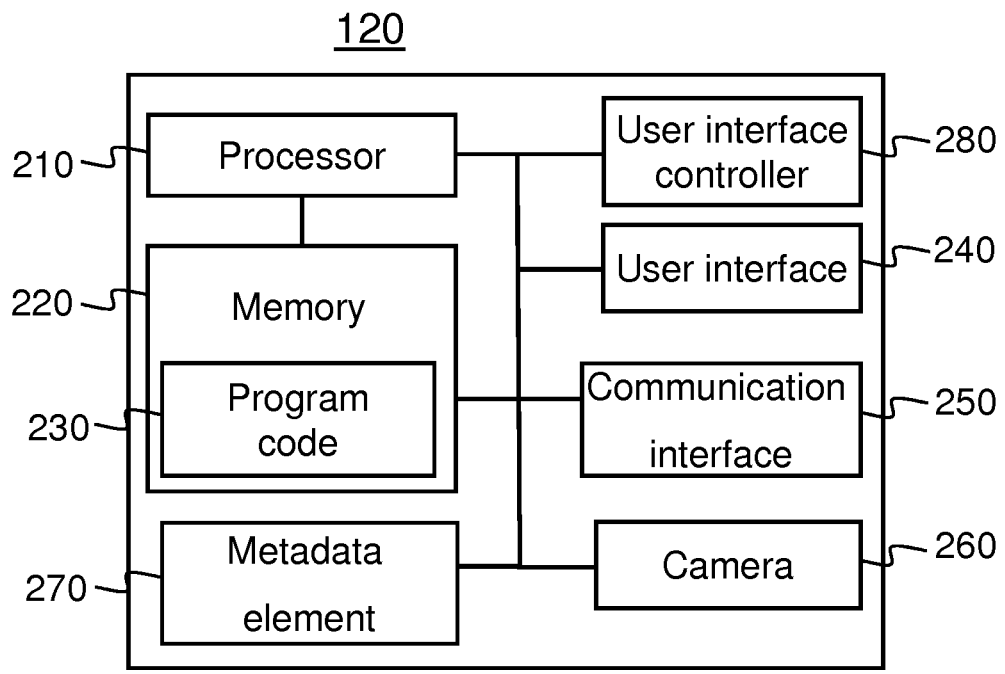
FIG. 2 presents an example block diagram of a user apparatus in which various embodiments of the present disclosure may be applied.

FIG. 2 presents an example block diagram of a user apparatus 120 in which various embodiments of the present disclosure may be applied. The user apparatus 120 may be a multimedia device 110, a user equipment (UE), a user device or an apparatus, such as a mobile terminal, a smart phone, a tablet or other communication device.

The general structure of the user apparatus 120 comprises a user interface 240, a communication interface 250, a metadata element 270, a camera 260, a processor 210, and a memory 220 coupled to the processor 210. The user apparatus 120 further comprises software 230 stored in the memory 220 and operable to be loaded into and executed in the processor 210. The software 230 may comprise one or more software modules and can be in the form of a computer program product. The software 230 may also provide metadata information relating to the software and hardware of the user apparatus 120. The user apparatus 210 may further comprise a user interface controller 280.

The processor 210 may be, e.g., a central processing unit (CPU), a microprocessor, a digital signal processor (DSP), a graphics processing unit, or the like. FIG. 2 shows one processor 210, but the user apparatus 120 may comprise a plurality of processors.

The memory 220 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The user apparatus 120 may comprise a plurality of memories. The memory 220 may be constructed as a part of the user apparatus 120 or it may be inserted into a slot, port, or the like of the user apparatus 120 by a user. The memory 220 may serve the sole purpose of storing data, or it may be constructed as a part of an apparatus serving other purposes, such as processing data. A proprietary multimedia application, a client application, a default multimedia application and multimedia data may be stored to the memory 220.

The user interface controller 280 may comprise circuitry for receiving input from a user of the user apparatus 120, e.g., via a keyboard, graphical user interface shown on the display of the user interfaces 240 of the user apparatus 120, speech recognition circuitry, or an accessory device, such as a headset, and for providing output to the user via, e.g., a graphical user interface or a loudspeaker.

The metadata element 270 comprises element configured to provide metadata information. Such elements may comprise, for example, a positioning device, an accelerometer, a temperature gauge, a clock or a microphone.

The camera 260 may be a still image camera or a video stream camera, capable for creating multimedia data and providing metadata information.

The communication interface module 250 implements at least part of radio transmission. The communication interface module 250 may comprise, e.g., a wireless or a wired interface module. The wireless interface may comprise such as a WLAN, Bluetooth, infrared (IR), radio frequency identification (RF ID), GSM/GPRS, CDMA, WCDMA, or LTE (Long Term Evolution) radio module. The wired interface may comprise such as universal serial bus (USB), for example. The communication interface module 250 may be integrated into the user apparatus 120, or into an adapter, card or the like that may be inserted into a suitable slot or port of the user apparatus 120. The communication interface module 250 may support one radio interface technology or a plurality of technologies. The user apparatus 120 may comprise a plurality of communication interface modules 250. Captured multimedia may be transmitted to a wireless communication network using the communication interface 250.

A skilled person appreciates that in addition to the elements shown in FIG. 2, the user apparatus 120 may comprise other elements, such as microphones, extra displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the user apparatus 120 may comprise a disposable or rechargeable battery (not shown) for powering when external power if external power supply is not available.

In an embodiment, the user apparatus 120 comprises speech recognition means. Using these means, a pre-defined phrase may be recognized from the speech and translated into a metadata tag. This tag may then be used as any other metadata, for example for characterizing the captured multimedia or for grouping images together, for example.

In an embodiment, a first, a second and a third user apparatus may correspond to an apparatus 120 of FIG. 2. Not all elements of FIG. 2 are required to be included in all user apparatuses 120, 160, 180. For example the camera 260 and the metadata element 270 are not needed necessarily.

In an embodiment, a first user apparatus 160 may comprise only some of the elements of the user apparatus 120 of FIG. 2. For example, metadata element 270 and camera 260 are not necessary in the first user apparatus for defining the task.

In an embodiment, a second user apparatus 120 may comprise only some of the elements of the user apparatus 120 of FIG. 2. For example, metadata element 270 and camera 260 are not necessary in the second user apparatus if the multimedia data is created using an attached multimedia device 110, for example.

In an embodiment, a third user apparatus 180 may comprise only some of the elements of the user apparatus 120 of FIG. 2. For example, metadata element 270 and camera 260 are not necessary in the third user apparatus 180 for requesting the multimedia data available and provided by the task.

Figure 3:
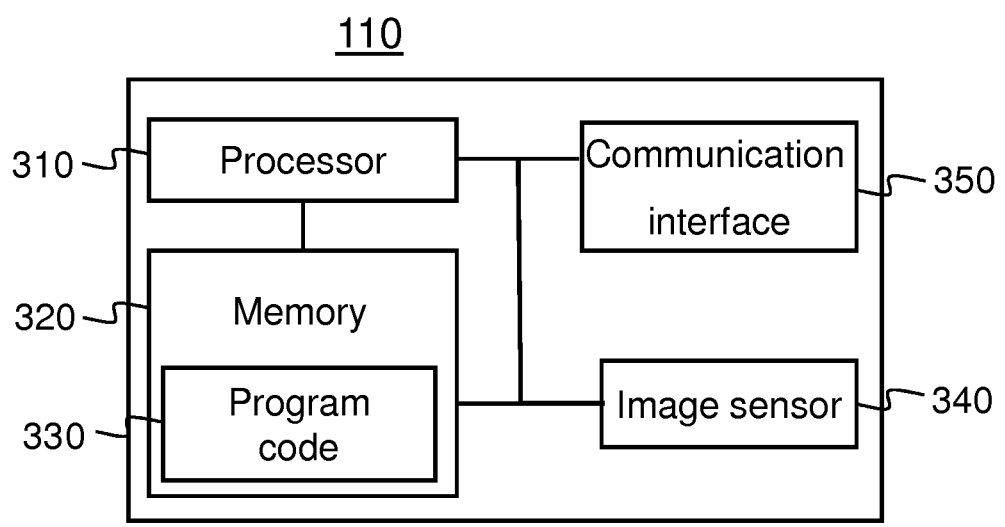
FIG. 3 presents an example block diagram of a multimedia device in which various embodiments of the present disclosure may be applied.

FIG. 3 presents an example block diagram of a multimedia device 110 in which various embodiments of the present disclosure may be applied. The multimedia device 110 may be a digital still camera or digital video camera, for example.

The general structure of the multimedia device 110 comprises a processor 310, and a memory 320 coupled to the processor 310. The multimedia device 110 further comprises software 330 stored in the memory 320 and operable to be loaded into and executed in the processor 310. The software 330 may comprise one or more software modules and can be in the form of a computer program product. The software 330 may provide metadata information of the software or hardware of the multimedia device 110.

The processor 310 may be, e.g., a central processing unit (CPU), a microprocessor, a digital signal processor (DSP), a graphics processing unit, or the like. FIG. 3 shows one processor 310, but the multimedia device 110 may comprise a plurality of processors.

The memory 320 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The multimedia device 110 may comprise a plurality of memories. The memory 320 may be constructed as a part of the multimedia device 110 or it may be inserted into a slot, port, or the like of the multimedia device 110 by a user. The memory 320 may serve the sole purpose of storing data, or it may be constructed as a part of an apparatus serving other purposes, such as processing data.

The image sensor 340 may be a device converting an optical image into an electronic signal, for example a charge-coupled device (CCD) or a complementary metal-oxide-semiconductor (CMOS) active pixel sensor. The image sensor 340 may provide metadata information of the image sensor 340.

The communication interface module 350 implements at least part of radio transmission. The communication interface module 350 may comprise, e.g., a wireless or a wired interface module. The wireless interface may comprise such as a WLAN, Bluetooth, infrared (IR), radio frequency identification (RF ID), GSM/GPRS, CDMA, WCDMA, or LTE (Long Term Evolution) radio module. The wired interface may comprise such as universal serial bus (USB), for example. The communication interface module 350 may be integrated into the multimedia device 110, or into an adapter, card or the like that may be inserted into a suitable slot or port of the multimedia device 110. The communication interface module 350 may support one radio interface technology or a plurality of technologies. The multimedia device 110 may comprise a plurality of communication interface modules 350. Captured multimedia data of the multimedia device 110 may be transmitted to a user apparatus 120 or to a computer apparatus using the communication interface 350.

Figure 4:
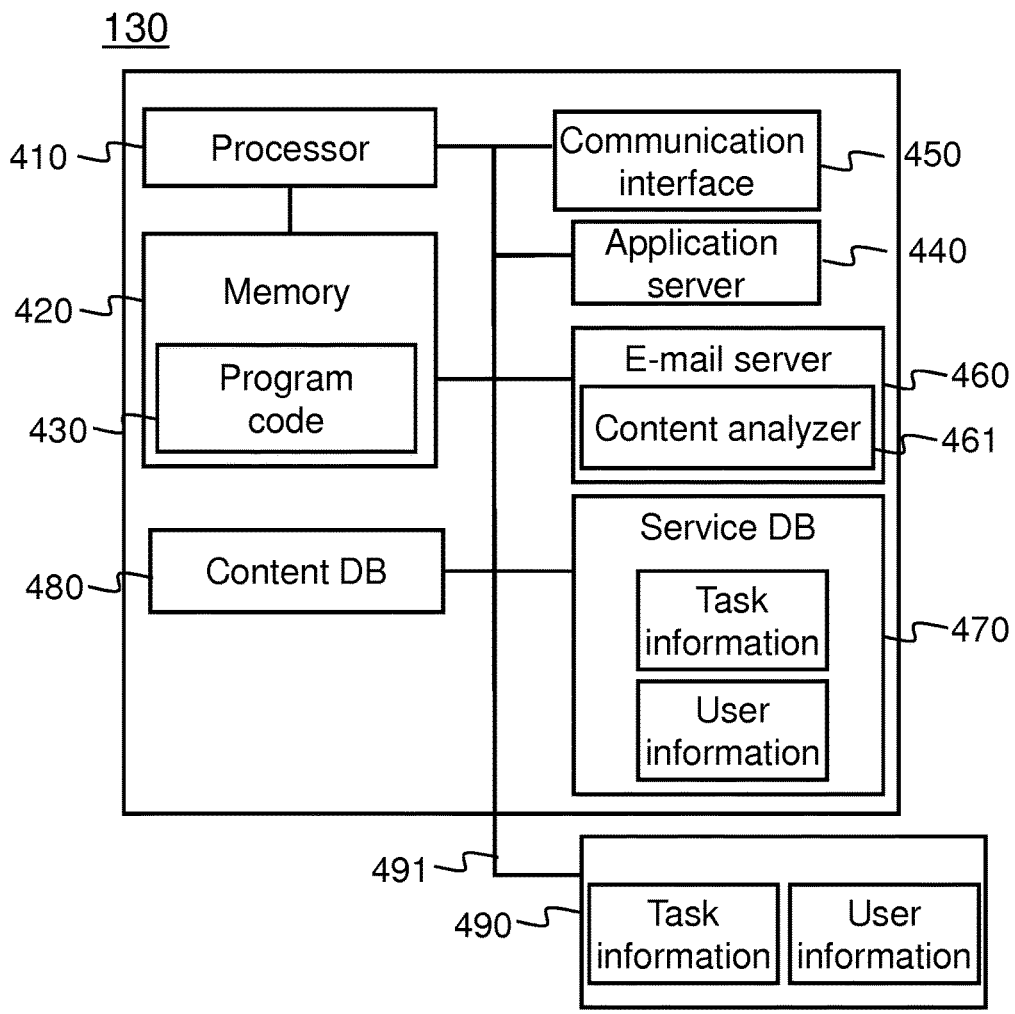
FIG. 4 presents an example block diagram of a server apparatus in which various embodiments of the present disclosure may be applied.

A skilled person appreciates that in addition to the elements shown in FIG. 3, the multimedia device 110 may comprise other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the multimedia device 110 may comprise a disposable or rechargeable battery (not shown) for powering when external power if external power supply is not available FIG. 4 presents an example block diagram of a server apparatus 130 in which various embodiments of the present disclosure may be applied.

The general structure of the server apparatus 130 comprises a processor 410, and a memory 420 coupled to the processor 410. The server apparatus 130 further comprises software 430 stored in the memory 420 and operable to be loaded into and executed in the processor 410. The software 430 may comprise one or more software modules and can be in the form of a computer program product.

The processor 410 may be, e.g., a central processing unit (CPU), a microprocessor, a digital signal processor (DSP), a graphics processing unit, or the like. FIG. 4 shows one processor 410, but the server apparatus 130 may comprise a plurality of processors.

The memory 420 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The server apparatus 130 may comprise a plurality of memories. The memory 420 may be constructed as a part of the server apparatus 130 or it may be inserted into a slot, port, or the like of the server apparatus 130 by a user. The memory 420 may serve the sole purpose of storing data, or it may be constructed as a part of an apparatus serving other purposes, such as processing data.

The communication interface module 450 implements at least part of radio transmission. The communication interface module 450 may comprise, e.g., a wireless or a wired interface module. The wireless interface may comprise such as a WLAN, Bluetooth, infrared (IR), radio frequency identification (RF ID), GSM/GPRS, CDMA, WCDMA, or LTE (Long Term Evolution) radio module. The wired interface may comprise such as universal serial bus (USB), for example. The communication interface module 450 may be integrated into the server apparatus 130, or into an adapter, card or the like that may be inserted into a suitable slot or port of the server apparatus 130. The communication interface module 450 may support one radio interface technology or a plurality of technologies. The server apparatus 130 may comprise a plurality of communication interface modules 450. Captured multimedia data of the multimedia device 110 or the user apparatus 120 may be received by the server apparatus 130 using the communication interface 450.

The e-mail server process 460, which receives e-mail messages sent from user apparatuses 120, 160, 180 and computer apparatuses via the network 150. The server 460 may comprise a content analyzer module 461, which checks if the content of the received message meets the criteria that are set for new content data for the defined task in the service. The content analyzer module 461 may for example check, whether the e-mail message contains a valid still image or a video stream. The valid content data received by the e-mail server is then sent to an application server 440, which provides application services e.g. relating to user information stored in a user service database 470 and content of the content management service. In the service database 470, task information for multimedia data requests may also be stored. The task information may also be stored in the external apparatus 490, wherein multimedia, user information and task information may be stored over a data connection 491. The data connection 491 may comprise several connections, such as the connection 151 and the internet 150 of FIG. 1, for example.

The task information stored in either of the storage device 131 or the external apparatus 490 may comprise task requests for multimedia data within a certain geographical location with a certain radius, for example. Furthermore, user location information may be stored in the service database 470 or in the external apparatus 490. The user location information may comprise information of registered users and their registered hotspots or current location. The user information may further comprise for example, a multimedia device type, multimedia device model information or software version information of the multimedia device, for example. Such information may further be used for task requests. Content provided by the service system 100 is stored in a content database 480.

A skilled person appreciates that in addition to the elements shown in FIG. 4, the server apparatus 130 may comprise other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like.

Figure 5:
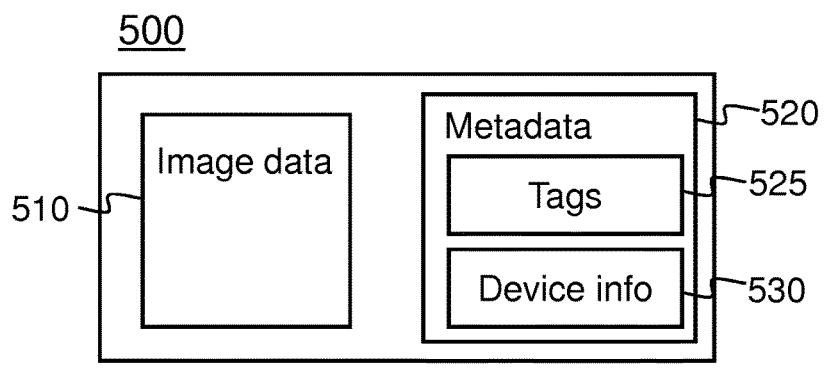
FIG. 5 shows an overall block diagram of an example multimedia data item.

FIG. 5 shows an overall block diagram of an example multimedia data item 500 according to an example embodiment of the present disclosure.

The multimedia data item 500 comprises multimedia data 510, such as image data. Furthermore, the multimedia data item 500 comprises metadata 520. In an embodiment, the metadata 520 comprises multimedia device information 530 as a searchable metadata element for validation of the multimedia data item 500. The metadata 520 may further comprise metadata tags 525 for providing task criteria for the multimedia data 510, for example.

The metadata 520 may be written into the multimedia data item 500 for identifying who owns the multimedia data, such as image data 510, copyright & contact information, what camera created the file, along with exposure information and descriptive information such as keywords about the photo, making the file searchable on the computer and/or the Internet. Some metadata 520 may be written by the camera and further metadata 520 may be input by the photographer, user and/or computer software after downloading the multimedia data 510 to a computer, for example.

The metadata 520 may be configured to use a certain standard format, such as Exchangeable Image Format (EXIF). Specifically, FIG. 5 illustrates a single digital image 500 stored in the EXIF format, such as in a file on a computer or on a removable media device in a digital camera. As will be appreciated by those skilled in the art, an EXIF file 500 may contain multiple digital images having a similar format. The metadata 520 may also comprise at least two metadata, for example simple metadata and complex metadata. In FIG. 5 only a single metadata 520 is showed, for simplicity. The metadata 520 may include tags 525. The tags 525 include information such as descriptions, copyright information, date and time information, camera settings such as camera model and make, and information that varies with each image such as orientation (rotation), aperture, shutter speed, focal length, metering mode, location information, and ISO speed information. The tags may further comprise a thumbnail for previewing the picture on the camera's LCD screen, in file managers, or in photo manipulation software.

The metadata 520 format may comprise standard tags 525 for location information. Cameras and mobile devices may have a built-in GPS receiver or a cellular positioning device that stores the location information in the metadata tags 525 when the picture is taken. Some other cameras have a separate GPS receiver that fits into the flash connector, for example. Recorded GPS data can also be added to any digital photograph on a computer, either by correlating the time stamps of the photographs with a GPS record from a hand-held GPS receiver or manually using a map or mapping software. The process of adding geographic information to a photograph is known as geocoding. A system server may allow their users to upload geocoded pictures or to add geolocation information online.

In an embodiment, geographic location data is comprised in the tags 525. Furthermore, the device info 530 may be comprised in the tags 525.

In an embodiment, the metadata 520 may be configured to use any other standard format, such as:
  IPTC Information Interchange Model IIM (International Press Telecommunications Council),
  IPTC Core Schema for XMP,
  XMP—Extensible Metadata Platform (an Adobe standard),
  Dublin Core (Dublin Core Metadata Initiative—DCMI), or
  PLUS (Picture Licensing Universal System).

Figure 6:
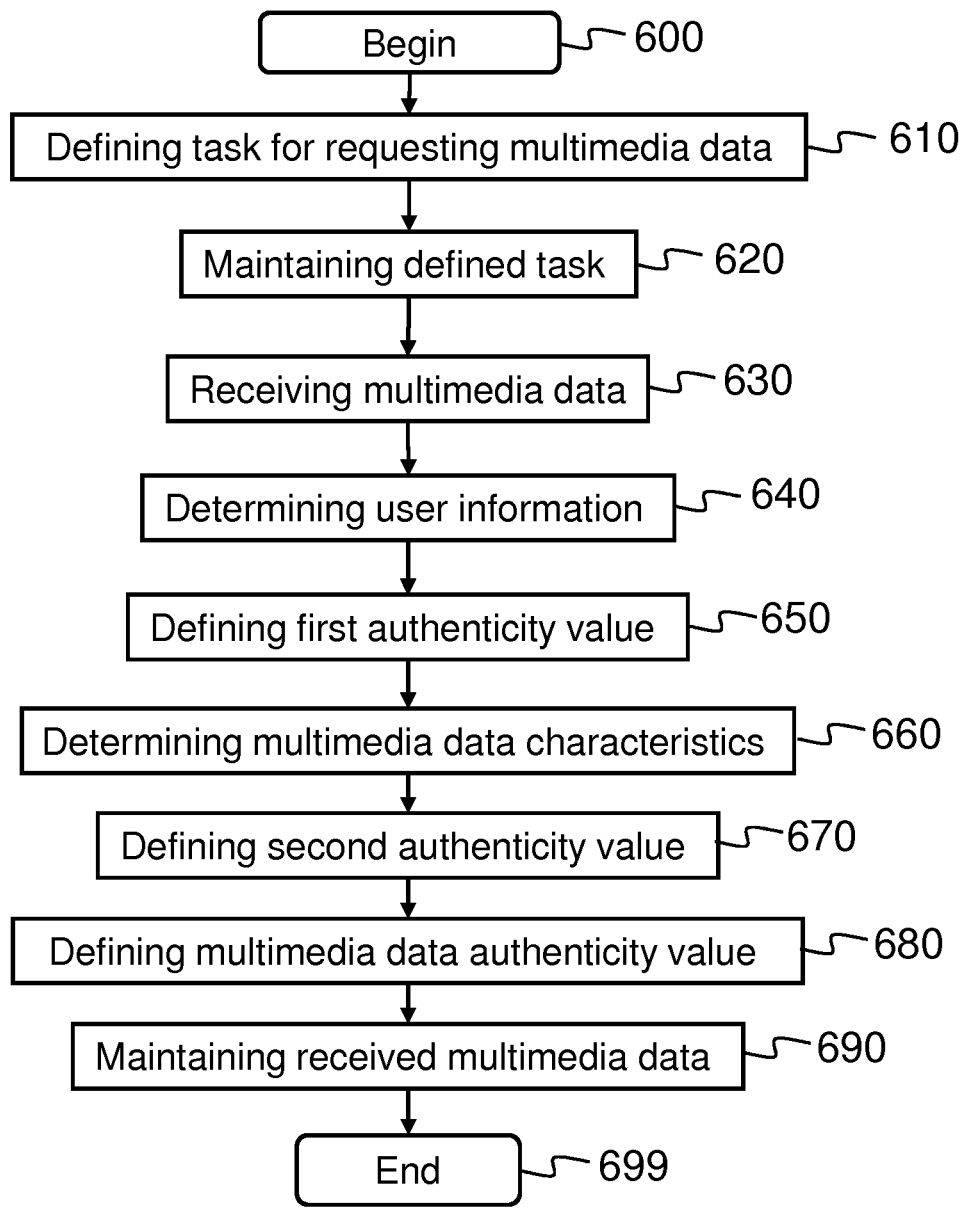
FIG. 6 shows a flow diagram showing operations in accordance with an example embodiment of the present disclosure.

FIG. 6 shows a flow diagram showing operations in accordance with an example embodiment of the present disclosure. In step 600, the method is started. In step 610, a task for requesting multimedia data is defined by a first user, wherein the task comprising criteria for the requested multimedia data. In step 620, the defined task is maintained, by an operator based on the criteria, wherein the task being available for a second user. In step 630, multimedia data is received, from the second user. The multimedia data may be received in response to the defined task based on the criteria. In step 640, user information is determined relating to the second user. In step 650, a first authenticity value is defined based on the user information. In step 660, multimedia data characteristics relating to the multimedia data are determined. In step 670, a second authenticity value is defined based on the multimedia data characteristics. In step 680, a multimedia data authenticity value is defined using the first and the second authenticity value. In step 690, the received multimedia data associated with the multimedia data authenticity value is maintained by the operator, wherein the multimedia being available for a third user. The method ends in step 699.

In an embodiment, a service user may define a task in the service system. Such task may be stored to the server apparatus and comprise a request for certain type of multimedia data with certain criteria. The requested multimedia type may be streaming video or still image, for example. The requested multimedia criteria may comprise, for example, certain authenticity value, certain authenticity level, certain location, time, event or object. Other users of the system and registered to the server apparatus may capture the requested multimedia data using a user apparatus or a multimedia device and deliver the multimedia data to the server in response to the task.

The requested task may relate to a certain geographical area. For example, the desired multimedia data may relate to an event taking place in certain geographical location.

In an embodiment, the task may be provisioned to a group of users based on certain criteria. For example, the task may be provisioned to certain users that are assumed to be located close to the geographical area of the requested task. In such cases, hotspot information may be used in task provisioning. The task may be provisioned to certain users defined by the task creator by selecting the users.

In an embodiment, a task may be provisioned to users that are located in a certain geographical location. Second users providing multimedia data to such task may be required to provide the geographical location for the captured multimedia data. The location information may be input to the metadata of the multimedia data submitted to the task. The location information may be checked by the system when receiving the data and approving only multimedia data fulfilling the location requirement for the task. The location requirement for the task may be defined with a certain threshold i.e. the location information of the multimedia data should be within certain geographical area defined by the criteria.

In an embodiment, a new task may be received by the system and the task information is stored to the server. The task comprises criteria for the requested multimedia data, set by a first user defining the task. The criteria may relate to a location for the multimedia data, for example. The task may be responded by at least one second user providing multimedia data for the task. The first user defining the task may define if all multimedia data received for the task will be approved or if the first user will approve the multimedia data before being available for third users. Furthermore, the first user may define if the multimedia data are available to third users right after receiving the data or after the task being expired. Such settings may be included in the task criteria. There may be a plurality of tasks available at the server defined by at least one first user.

In an embodiment, the multimedia data provided by the second users for the tasks defined by the first users are available for third users. The third users may browse the multimedia data for all tasks and request for any of the data. The browsing view may be selected by the third user. The view may comprise the tasks or only the multimedia data submitted.

In an embodiment, the second users may browse all active tasks for requesting multimedia data. The second users may also use different browsing parameters to seek for tasks relevant to them, for example tasks relating to their geographical location or tasks being still empty, such as task.

In an embodiment, the tasks may define also the price information for the multimedia data. The price information may comprise price paid for second users submitting multimedia data for the task. Furthermore, the price information may comprise price for the third users to receive multimedia data of the task. The third user may request all the multimedia data for certain task or only some of them. The third user may also request for all the current multimedia data available for the task and also the coming future multimedia data for the task in case the task is still active.

Thus it is possible to verify the authenticity of user generated content quickly and efficiently. In an embodiment, the verification process displays each uploaded image with a graphical tag depicting scores ranging from 1-5 based on key authentication factors. Authentication has now become part of the editing process.

To uphold the highest standards of accuracy, many journalistic institutions are spending hours in an ongoing effort to ensure image authenticity, often under deadline pressure. In a world where every second counts, media companies do not have the time or resources to manually verify every image they want to publish. Time and labor aside, manual inspection methods cannot mitigate the risk of manipulated images. For this reason, the embodiments of the present disclosure show instantly and graphically the authenticity level of any user-submitted image to media companies, for example. The system basically substitutes an inherently flawed manual process that may take an hour per image for a highly-automated, intelligent program that takes seconds.

In an embodiment, images may achieve a top authenticity score if they are taken with a proprietary mobile application, not imported from the mobile apparatus photo gallery. This scenario guarantees that the photo has not been removed from the proprietary service ecosystem and the image has not been edited or altered in any way. Each pixel of the photo file is transferred as captured by the mobile apparatus (such as a mobile phone) camera. The authenticity program, as described by different embodiments of the invention, works by automatically analyzing images against a plurality of criteria ranging from image resolution to the likelihood that the photo's metadata has been modified. If further authentication is required, the system provides access to the photographer's contact information, for example.

While manual verification may still play a crucial role in user generated content (UGC) workflow, media companies, with the increasing volume of content, need cutting edge tools to verify visual content. The described authenticity system saves media groups time and money while safeguarding accuracy and improving the competitive edge.

Various embodiments have been presented. It should be appreciated that in this document, words comprise, include and contain are each used as open-ended expressions with no intended exclusivity. If desired, the different functions discussed herein may be performed in a different order and/or concurrently with each other. Furthermore, if desired, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. A method at a server apparatus for providing multimedia data, the method comprising:
receiving multimedia data, from a second user, over a path of a plurality of paths;
determining, in response to receiving the multimedia data, user history information relating to the second user based on user information stored in a user service database of the server apparatus;
defining a first authenticity value based on the determined user history information;
determining multimedia data characteristics of the received multimedia data, the multimedia data characteristics comprising path information for indicating receiving path of the multimedia data from the second user, the path information comprising an application identifier for indicating an application capturing the multimedia data and configured to indicate a first path and a second path, wherein
the first path, indicated by a proprietary application identifier, comprising sending multimedia data captured by a proprietary application of a second user apparatus over a wireless communication network and public data communication network to the server apparatus, the proprietary application being a client application of a service whose server application is running on the server apparatus; and
the second path, indicated by a default imaging application identifier, comprising sending multimedia data captured by a default imaging application of the second user apparatus over the wireless communication network and the public data communication network to the server apparatus;
defining a second authenticity value based on the multimedia data characteristics;
defining a multimedia data authenticity value using the first and the second authenticity value; and
maintaining, by an operator, the received multimedia data associated with the multimedia data authenticity value, wherein the multimedia data associated with the multimedia data authenticity value being available for a third user.

2. The method of claim 1, further comprising:
defining, by a first user, a task for requesting multimedia data using the proprietary application, wherein the task comprising criteria for the requested multimedia data;
maintaining, by an operator, the defined task based on the criteria, wherein the task being available for a second user; and
receiving multimedia data, from the second user, in response to the defined task based on the criteria.

3. The method of claim 1, wherein the multimedia data characteristics comprising at least one of the following:
location information associated with the multimedia data;
metadata of the multimedia data; and
resolution information of the multimedia data.

4. The method of claim 3, further comprising:
defining the second authenticity value using the multimedia data characteristics with different weighting factors.

5. The method of claim 1, wherein the user information comprising at least one of the following:
an e-mail address;
a phone number;
an external verification; and
a history value.

6. The method of claim 5, wherein the external verification comprising at least one of bank verification or credit card information.

7. The method of claim 4, further comprising:
defining the first authenticity value using the user information with different weighting factors.

8. The method of claim 2, wherein the criteria comprising the multimedia data authenticity value.

9. The method of claim 1, further comprising:
defining the multimedia data authenticity value using the first and the second authenticity value with different weighting factors.

10. The method of claim 1, further comprising:
determining a first weighting factor for the first authenticity value and a second weighting factor for the second authenticity value; and
defining the multimedia data authenticity value using the first and the second weighting factors.

11. The method of claim 1 to, further comprising:
receiving a request for the multimedia data from the third user; and
transmitting the multimedia data for the third user.

12. The method of claim 11, wherein the request being associated with a criteria comprising the multimedia data authenticity value.

13. The method of claim 1, further comprising:
providing the multimedia data authenticity value for the third user using at least one of the following:
a color code;
a percentage;
a bar; and
a meter.

14. An apparatus comprising:
a communication interface for transceiving multimedia data;
at least one processor; and
at least one memory including computer program code;
the at least one memory and the computer program code configured to, with the at least one processor, cause the apparatus to:
receive multimedia data, from a second user, over a path of a plurality of paths;
determine, in response to receiving the multimedia data, user history information relating to the second user based on user information stored in a user service database of the server apparatus;
define a first authenticity value based on the determined user history information;

determine multimedia data characteristics of the received multimedia data, the multimedia data characteristics comprising path information for indicating receiving path of the multimedia data from the second user, the path information comprising an application identifier for indicating an application capturing the multimedia data and configured to indicate a first path and a second path, wherein the first path, indicated by a proprietary application identifier, comprising sending multimedia data captured by a proprietary application of a second user apparatus over a wireless communication network and public data communication network to the server apparatus, the proprietary application being a client application of a service whose server application is running on the server apparatus; and the second path, indicated by a default imaging application identifier, comprising sending multimedia data captured by a default imaging application of the second user apparatus over the wireless communication network and the public data communication network to the server apparatus;

define a second authenticity value based on the multimedia data characteristics;

define a multimedia data authenticity value using the first and the second authenticity value; and maintain the received multimedia data associated with the multimedia data authenticity value, wherein the multimedia data associated with the multimedia data authenticity value being available for a third user.

15. A computer program embodied on a computer readable non-transitory medium comprising computer executable program code which, when executed by at least one processor of an apparatus, causes the apparatus to:

receive multimedia data, from a second user, over a path of a plurality of paths;

determine, in response to receiving the multimedia data, user history information relating to the second user based on user information stored in a user service database of the server apparatus;

define a first authenticity value based on the determined user history information;

determine multimedia data characteristics of the received multimedia data, the multimedia data characteristics comprising path information for indicating receiving path of the multimedia data from the second user, the path information comprising an application identifier for indicating an application capturing the multimedia data and configured to indicate a first path and a second path, wherein the first path, indicated by a proprietary application identifier, comprising sending multimedia data captured by a proprietary application of a second user apparatus over a wireless communication network and public data communication network to the server apparatus, the proprietary application being a client application of a service whose server application is running on the server apparatus; and the second path, indicated by a default imaging application identifier, comprising sending multimedia data captured by a default imaging application of the second user apparatus over the wireless communication network and the public data communication network to the server apparatus;

define a second authenticity value based on the multimedia data characteristics;

define a multimedia data authenticity value using the first and the second authenticity value; and maintain the received multimedia data associated with the multimedia data authenticity value, wherein the multimedia data associated with the multimedia data authenticity value being available for a third user.

\* \* \* \* \*